United States Patent [19]
Luz

[11] 3,803,571
[45] Apr. 9, 1974

[54] APPARATUS FOR MONITORING TEST ANIMAL ACTIVITY

[75] Inventor: Hans G. Luz, Reutlingen, Germany

[73] Assignee: Institute Dr. Friedrich Forster, Prufgeratebau, Reutlingen, Germany

[22] Filed: Oct. 24, 1972

[21] Appl. No.: 299,775

[30] Foreign Application Priority Data
Oct. 21, 1971  Germany............................ 2152406

[52] U.S. Cl.......... 340/258 C, 235/92 MT, 331/65, 340/279
[51] Int. Cl. ......................................... G08b 13/24
[58] Field of Search.... 340/279, 258 C; 235/92 MT; 331/65; 119/155

[56] References Cited
UNITED STATES PATENTS

| | | |
|---|---|---|
| 3,633,001 | 1/1972 | Vajnovsky ......................... 340/279 |
| 3,111,608 | 11/1963 | Boenning et al. ................. 340/279 |
| 3,465,724 | 9/1969 | Broadbent ....................... 340/258 C |
| 3,676,772 | 7/1972 | Lee ................................. 340/258 C |

Primary Examiner—John W. Caldwell
Assistant Examiner—Glen R. Swann, III

[57] ABSTRACT

Animals of different selected groups are provided with electrically conducting and/or ferromagnetic actuator elements of different predetermined electrical conductivity and/or magnetic permeability. Test coils are arranged about the animal enclosure and are connected to different measuring circuit apparatus, one for each group to be monitored, which apparatus are individually responsive to the presence of the test animals provided actuator elements within the magnetic field of the coils. In this manner, each animal of each group will produce a discrete signal representative of the group to which it belongs.

8 Claims, 5 Drawing Figures

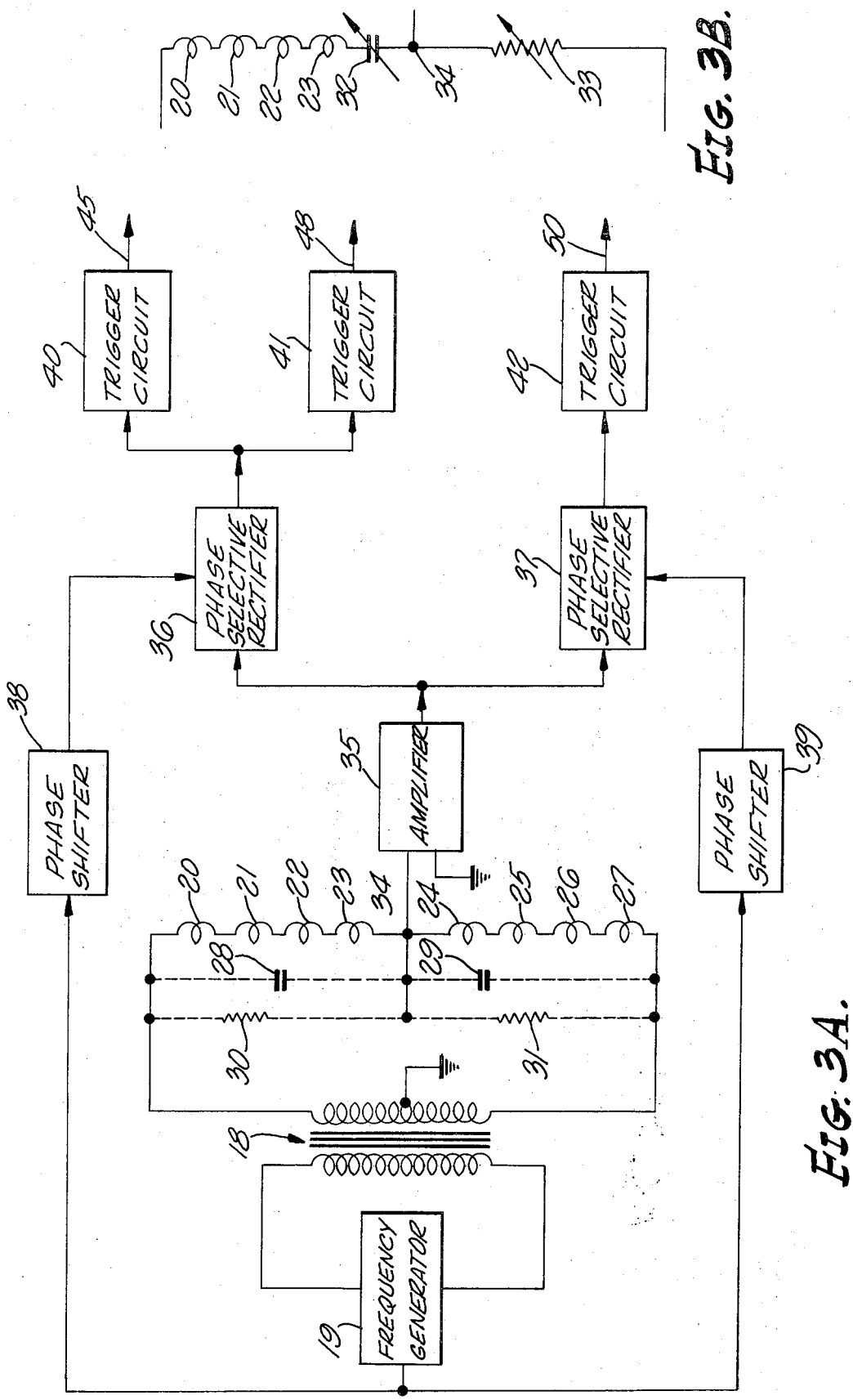

3,803,571

APPARATUS FOR MONITORING TEST ANIMAL ACTIVITY

FIELD OF THE INVENTION

The present invention relates generally to apparatus for monitoring test animal activity, and, more particularly, to such apparatus for monitoring individually different categories of test animals confined in a common enclosure.

BACKGROUND OF THE INVENTION

In medical and pharmaceutical research, new drugs, preparations and the like are frequently tried out on animals such as mice, rats, and, more recently, fish. An important object of such testing is the assessment of test animal activity as it is related to the drugs, preparations, or the like, administered to the animals. Although direct observation by humans is sometimes used, it is difficult and not easily related to objective standards. Accordingly, apparatus has been developed in the past which automatically measures and reports activities of the test animals over any prescribed period of time.

In certain known equipment, the test animals are kept in an enclosure constructed of a non-ferromagnetic and nonconducting material. A plurality of uniformly distributed, flat, serially connected coils are located in the enclosure bottom or floor. The coils are interconnected to form an oscillating circuit which is excited at a predetermined frequency. A test animal moving over or closely adjacent to one of the coils modifies the impedance of the coil, producing a change in the voltage of the oscillating circuit as well as its frequency. These changes in voltage and frequency serve as a means for evaluating the activity of the test animals.

Many test animals only react normally when in groups. In the prior system discussed above, measurement of animals in a group is possible, however, in many cases it is also important to be able to separate the activity of one or more animals in the group and assess their activity individually. Accordingly, in such systems the individual animal to be monitored has been provided with a small ring of metal such that as the animal moves over one of the coils in the enclosure floor, the effect on the oscillating circuit is substantially greater than that which is produced by the animal without the ring. Circuit apparatus for evaluating animal activity is thresholded to be operated only by an animal including a ring and not by the other animals in the group. Accordingly, one or more so treated animals may be studied while they are living and reacting in a group of other non-treated animals, and the non-treated animals will not influence measurements taken.

The above described known apparatus can be constructed so as to permit evaluating the activities of two different groups of test animals; one including a metal ring and the other group being untreated. In the first case, the evaluation circuitry is made to respond to a higher level signal; whereas the second group circuit only responds to a much lower signal, corresponding to that produced by an untreated animal. However, such a technique is not amenable for application to evaluating activities of a set of test animals comprising more than two identifiable groups.

In accordance with another known technique, the test animals are provided with a material which reflects infrared light and infrared receivers are located about the animal enclosure detecting the reflection of infrared light irradiating the animals. A primary disadvantage of this technique is that the test animals do not react normally as a result of the infrared radiation. Also, a further defect is that the technique does not allow the determination of the activity of any selected animals or groups apart from the entire set of animals.

SUMMARY OF THE INVENTION

In accordance with the practice of this invention, animals of different selected groups are provided with electrically conducting and/or ferromagnetic acutator elements of different predetermined electrical conductivity and/or magnetic permeability. That is, all of the animals in each test group are provided with such actuator elements having the same electrical conductivity and/or magnetic permeability. Test coils are arranged about the animal enclosure and are connected to different measuring circuit apparatus, one for each group to be monitored, which apparatus are individually responsive to the passage of the test animals (and their actuator elements) through the magnetic field of the coils. In this manner, each animal of each group will produce a discrete signal output representative of the group to which it belongs.

DESCRIPTION OF THE FIGURES

FIG. 3a is a circuit schematic of one form of the apparatus of this invention.

FIG. 3b depicts an alternate form of circuit apparatus.

DESCRIPTION OF PREFERRED EMBODIMENTS

Figure 1:
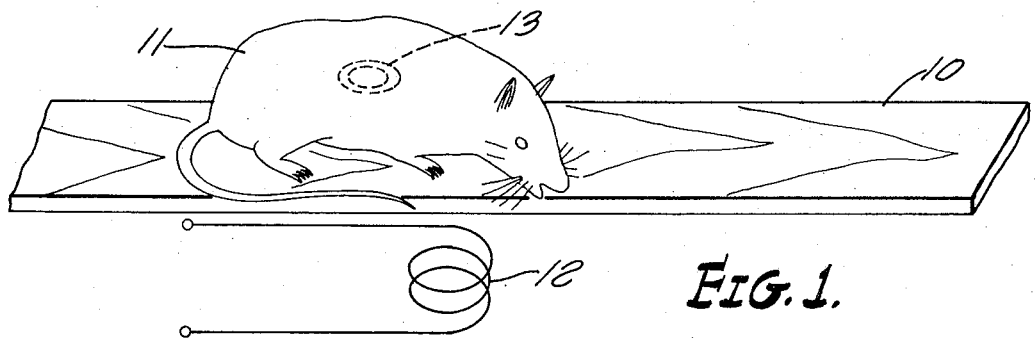
FIG. 1 is an elevational view, partially schematic, of a test animal shown on a portion of an enclosure floor and with a magnetic field generating coil located thereunder.

With reference now to the drawings and particularly to FIG. 1, the enclosure within which test animals are kept has been shown only in part, namely by a section of the floor 10, with it being understood that it is otherwise of conventional construction. In order not to adversely affect operation of the apparatus to be described, the animal enclosure should be constructed of a material that is electrically non-conductive and has relatively poor magnetic permeability. A test animal 11 is shown located closely adjacent one of a plurality of magnetic field generating coils 12 uniformly arranged on the lower surface of the enclosure floor 10, which coils are energized in a manner to be described. The test animal is provided with a device 13 of given electrical conductivity and magnetic permeability characteristics representative of the group or class to which the test animal belongs. As will be clarified below, each combination of predetermined conductivity and magnetic permeability in an actuator element 13 provides it with an individual electro-magnetic character enabling its identification by the apparatus to be described.

Figure 2:
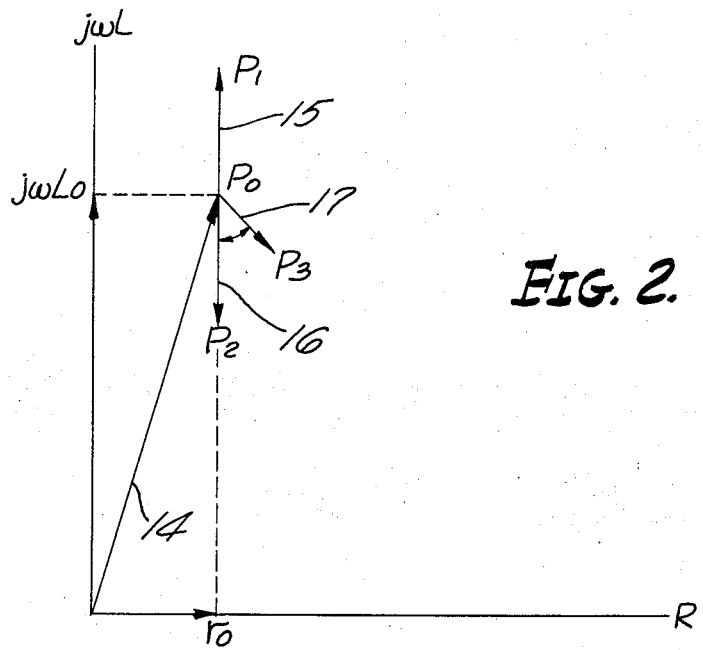
FIG. 2 is a vector diagram representative of impedance changes in the monitoring coil of FIG. 1 resulting from a test animal with a magnetically permeable and electrically conducting actuator element passing within range of the coil.

Turning now to FIG. 2, the impedance vector for the coil 12 with a test animal at a remote distance is identified by the numeral 14 and is composed of a substantially constant resistance component $R_0$ and an inductive reactance component $j\omega L_0$, where the point $P_0$ is the vector end point.

When a test animal having an actuator 13 made of a material having relatively high permeability and also relatively low electrical conductivity, e.g., a sintered ferrite, the end of the vector 14 will move from $P_0$ to some higher point $P_1$, thereby lengthening the vector 14 by an amount which approximates the vector 15.

If, on the other hand, the actuator 13 for the test animal is constructed of a good electrical conductor, it will act in a manner similar to that which would be achieved on a short-circuited secondary winding being loosely coupled with the winding 12. This result depends not only upon the conductivity of the actuator 13, but also upon its physical construction or geometry. If such an actuator has an inductive reactance which considerably exceeds the ohmic resistance $R_0$ of the material at the frequency of operation, the end of the impedance vector will be shifted from $P_0$ to some point $P_2$ as the test animal with the described actuator element moves over the coil 12. Also, it is to be noted that the inductive reactance of the coil 12 is reduced by a vector quantity enumerated as 16.

As a still further variation of the actuator element composition, if it is constructed of a material having a conductivity such that its ohmic resistance approximately equals the inductive reactance, then the tip of the vector 14 is transferred to a new point $P_3$ on movement of a test animal therepast. In this case, the resistance is greater than $R_0$ in the first described situation while the inductance is decreased a slight amount.

With a specified size and shape for the actuator 13 and a constant frequency of energizing power applied to the coil 12, further reduction of the actuator conductivity decreases the amount of shift of the vector tip, with the angle between the vectors 16 and 17 increasing accordingly. Therefore, in a material having a very low conductivity, the angle approximates 90° while the vector end point $P_3$ approaches $P_0$ so that $P_0$ and $P_3$ for practical purposes may be considered to be the same.

For an actuator constructed of a ferromagnetic material having better conductivity than in the first described situation, there will be an increase in the inductive reactance as well as the resistance for the coil 12. This results in a vector, the end point of which shifts generally along the same direction as the vector 14, but extends farther out.

As has already been alluded to, a test animal which does not include an actuator 13 of any kind will also produce a change in the coil impedance characteristics, although of a smaller amount, as it passes over the coil. Since for practical purposes most test animals are the same in this regard, the amount and angle of this change can be considered as solely a function of the measurement frequency.

As shown, changes in the impedance of coil 12 can be effected by means of using actuators 13 of different geometries and different combinations of conducting and ferromagnetic properties. Accordingly, an electrical measuring system which can determine this change in impedance of the coil 12 will also at the same time identify the test animal provided with the predetermined actuator 13 which is within the influencing range of the coil. In this manner, as will be more particularly described below, such a measuring system can then identify all those animals individually, or as a group, which are provided with the same type of actuator 13. Moreover, by providing different animals, or different groups of animals, with another type of actuator, this permits distinguishing these animals from those of the first group.

With reference now to FIG. 3a, there is shown there a circuit schematic of a system for evaluating the change in impedance in the coil 12 and thereby identifying the particular type of actuator and test animal, or group of test animals, causing the change in impedance. A transformer 18 has its primary connected to a source 19 of alternating electrical power at a given predetermined frequency which is also identified as a FREQUENCY GENERATOR. A plurality of coils 20–23 are serially arranged with a further identical set of such coils 24–27, which series arrangement is connected across the secondary of the transformer 18. The coils 20–23 are each identical with the coil 12 referenced in FIG. 1, and, as already described, are located under the floor of the animal enclosure. Coils 24–27, although identical electrically with the coils 12, are remotely located from the test animals and in an environment maintained at a common temperature. The secondary has its center-tap grounded such that the transformer secondary and the series arrangement of the coils 20–27 forms a bridge circuit which is initially balanced as long as no test animals are brought within range to modify the impedance of the coils 20–23. To achieve full balancing and compensate for any minor inductive differences that may exist between the various coils, either capacitor 28 or 29 is connected across the respective coil sets 20–23 or 24–27, as needed. Similarly, any minor changes in resistance that are necessary to achieve actual balancing for the two halves of the bridge, are provided by connecting either of resistors 30 or 31 of appropriate value across the coils 20–23 and 24–27, respectively.

As an option or alternative version, the coils 24–27 may be replaced by a single coil whose impedance closely approximates that of the coils 20–23. FIG. 3b shows an alternate bridge circuit arrangement and comprises the same set of coils 20–23 serially arranged with a variable capacitor 32 and a variable resistor 33, all connected across the transformer secondary as in the first described version. The capacitor is adjustable to a value such that the capacitive reactance $J/\omega C$ is very closely the same as the inductive reactance of the coils 20–23. With the inductive reactance being cancelled out by the capacitor 32, the resistor 33 is merely balanced to a value equal to the ohmic resistance of the coils 20–23 in order to achieve complete bridge balance. The common interconnection point 34 between the coils 23 and 24, the bridge output, is applied through an amplifier 35 to an input terminal of each of two phase selective rectifiers 36 and 37. A phase selective rectifier circuit is well known circuit apparatus which accepts two signals as input and provides a single output signal of magnitude proportional to the cosine of the phase angle between the two input signals. The voltage from the frequency generator 19 is applied via a pair of adjustable phase shifters 38 and 39, respectively, to the other input terminals of the phase selective rectifiers. The rectifier 36 output is connected to each of two trigger circuits 40 and 41 while the rectifier 37 output drives a single trigger circuit 42. The significance and information provided by the presence or absence of signals at the output of the triggers 40–42 will be described later herein.

Before entering into a detailed description of the operation of the circuits shown in FIGS. 3a and 3b, a brief discussion of the function and basis of operation of the phase-selective rectifiers 36 and 37 will be given. Their primary function is to compare the phase relationship of the voltage signal from the amplifier 35, $U_m$, with that of the control voltage from generator 19, $U_{st}$. The rectified output to the trigger circuits, $U_g$, has a magnitude proportional to $U_m$ and the cosine of the difference phase angle $\omega$ between $U_m$ and $U_{st}$. Expressed mathematically, this is, $$U_g = k\ U_m \cos\phi.$$

From the above it is clear that magnitude of the control voltage, $U_{st}$, is not material in determining the value of the rectifier output, $U_g$. If the $U_{st}$ and $U_m$ are in phase, i.e., $\phi = 0°$, the output voltage $U_g$ corresponds to the maximum positive rectified value of $U_m$. If, on the other hand, $U_{st}$ and $U_m$ are in phase opposition, i.e., $\phi = 180°$, $U_g$ corresponds to the maximum negative rectified value of $U_m$. With $\phi = 90°$ or $270°$, $U_m$ is zero.

In the ensuing description, the activities of three animals or three groups of animals are monitored. The animal or animals of group A are provided with an actuator 13 of ferromagnetic material characteristically having a high magnetic permeability; each in group B has an actuator of good electrical conductivity; and the actuator for group C are constructed of a material of significantly less conductivity than group B.

Figure 4:
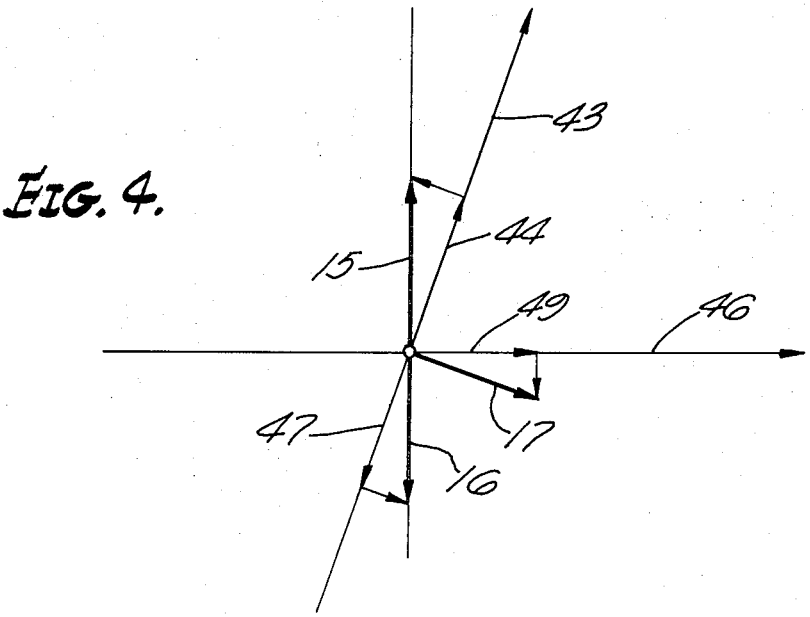
FIG. 4 is a graph of voltage vectors produced by a test animal passing adjacent a field generating monitoring coil.

When a group A animal passes within affective range of one of the coils 20–23, it will imbalance the bridge and supply an input signal to amplifier 35 from which signals are applied to both phase-selective rectifiers 36 and 37. Turning now also to FIG. 4, the bridge voltage corresponds with vector 15. Phase shifter 38 modifies the phase of the voltage from 19 such that the control signal applied to rectifier 36 corresponds to vector 43. A positive D. C. voltage will appear at the output of rectifier 36 having a magnitude corresponding to the projection 44 of vector 15 onto 43. The D. C. voltage is connected to the inputs of both trigger circuits 40 and 41, the first biased to only respond to positive signals, and the second to negative signals. In the present case with a group A animal influencing the coils 20–23 only, trigger circuit 40 is actuated. The switching signal made available at 45 as a result of the A animal activity is then utilized to actuate counting or other recording evaluation apparatus (not shown).

The signal presented to rectifier 36 from amplifier 35 is also applied to the phase selective rectifier 37. However, phase shifter 39 is so adjusted that the control voltage fed to rectifier 37, vector 46 is perpendicular to vector 15, which results in zero output for the rectifier as explained earlier. Of course, with zero signal applied to trigger circuit 42, it will not produce a switching signal.

If an animal with a B group actuator moves into influential range of one or more of the coils 20–23, a voltage having the characteristics of the vector 16 will be applied to the input terminals of phase selective rectifiers 36 and 37. The relative phase relationship of this signal to the control signal causes rectifier 36 to produce a negative output actuating trigger circuit 41, but leaving trigger 40 unaffected. The magnitude of the signal provided to activate trigger circuits 40 and 41 is essentially the projection of 16 onto the negative-going extension of 43, namely, vector 47. Switching signal 48 can be used to count or otherwise evaluate the animal activity. Since vectors 16 and 46, representing the measurement and control voltages, respectively, are perpendicular to each other, the phase selective rectifier 37 has no output and thus trigger circuit 42 produces no switching signal.

When an animal with a C group actuator influences one or more of the coils 20–23, a voltage corresponding to vector 17 in FIG. 4 is presented to each of the phase selective rectifiers 36 and 37. No output is produced by the rectifier 36, since vectors 17 and 43 are perpendicular to one another, and thus no switching signals 45 and 48 are generated. There is an output from 37, the magnitude of which is given by the vector 49, the latter being a projection of vector 17 onto 46. In this manner, trigger circuit 42 generates a switching signal 50 for use in the same way as described for the groups A and B animals.

On occasion, a problem may be encountered in that a test animal remains at rest over one or more of the coils 20–23, temporarily blocking monitoring of animal activities. This can be obviated by individual capacitors into the input lines to each of the trigger circuits 40–42 which will prevent the trigger circuits from being actuated by D. C. signals, but, on the other hand, will cause them to be actuated on relatively rapid changes of D. C. input. This circuit modification will also prevent spurious switching signals being generated by such things as, say, a gradual change in the bridge circuit produced by temperature variation.

As illustrated in the drawings, the actuator 13 is annular in shape, which, on occasion, makes its effect on the impedance of the coils 20–23 somewhat dependent on the orientation of the actuator as it is moved past the coils. An alternate form of the actuator which avoids the position dependency problem, is to make it spherical. More particularly, the hollow sphere constructed of plastic covered with a thin metal skin would possess the proper weight characteristics such that it could be carried by the animal without undue inconvenience and would, due to its geometry, not be position dependent. In addition, a protective layer may be provided over the metal skin to prevent its removal from contact with the animal. Since relatively high frequency voltages are contemplated for the frequency source 19, the depth of penetration of the coil field into the actuator would be very small so that even a very small thickness of metal skin over the plastic sphere would be adequate.

In the practice of the invention described herein, it is now possible to monitor the activities of three different groups of test animals, whereas in the past only two groups were able to be so examined. In addition, a further advantage is that whereas in certain of the past known systems selection between the two groups was made on the basis of the magnitude of the coil voltage, whereas in the subject invention the phase relation of the voltage is the determinative criterion.

If it is desired to have further groups or subgroups of test animals, this can be achieved simply by providing the first three groups (A, B and C) with actuator as described herein and, say, a second three groups (D, E and F) with similar actuators only of much larger dimensions. The circuit of FIGS. 3a and b would then be modified to add an additional trigger circuit in parallel with each of the trigger circuits 40, 41 and 42 where the thresholds of these additional triggers would respond to a higher coil voltage that would be achieved when the larger actuators were brought into influential range on the coils 20–23.

As a further possibility for increasing the number of groups or subgroups of animals to be monitored, actuators for the animals may be provided having smaller differentials of the phase angles corresponding to the coil voltage than in the previously described examples. If this approach is taken, the electronic apparatus would have to be able to produce an indication for these voltages over a very specific narrow range of phase angles and simultaneously surface voltages lying without the actuating range. It is within the skill of the electronic art to provide such apparatus.

What is claimed is:

1. Apparatus for determining the activity of different groups of test animals located within an enclosure, comprising:
    actuator means carried by the test animals, said means having a different electrical conductivity-magnetic permeability, characteristic for each group;
    coil means located within the enclosure such that the test animals and actuators carried thereby can be brought closely adjacent thereto during natural movement of the animals;
    alternating voltage source means connected to said coil means;
    circuit means for generating a signal each time an animal carrying an actuator is immediately adjacent said coil means, said circuit means including separate detector means for each animal group individually responsive to the impedance change in said coil means produced by an animal with actuator of the corresponding group being located nearby for producing a unique signal identifying the animal as to group.

2. Apparatus as in claim 1, in which the actuator means include a first actuator of high magnetic permeability to be carried by a first group of animals, a second actuator constructed of a material of relatively good conductivity to be carried by a second group of animals and a third actuator constructed of a material having a good conductivity substantially less than that of the second actuator to be carried by the animals of the third group.

3. Apparatus as in claim 1, in which said circuit means includes means interconnecting said coil means and said voltage source means forming a balanced bridge in the absence of test animals and producing an unbalance signal when an animal with actuator means is located within influential range of said coil means, and means responsive to both the polarity and magnitude of said unbalance signal for producing a signal identifying the group of test animals unbalancing the bridge.

4. Apparatus as in claim 3, in which said bridge means includes second coil means electrically identical with said first recited coil means and located remotely from the test animals, said first and second coil means being serially arranged with said alternating voltage source means.

5. Apparatus as in claim 3, in which said bridge means includes a resistance of value equal to the serial resistance of said coil means, and a capacitor having a capacitive reactance equal to the combined inductive reactance of said coil means, said resistance and capacitance being serially arranged with said coil means across said alternating voltage source.

6. Apparatus as in claim 3, in which said means for producing an identifying signal includes phase selective rectifier means having a pair of input terminals, means interconnecting the alternating voltage source to one of said rectifier means input terminals, means connecting the unbalance signal with the other rectifier means terminal, and trigger circuit means fed by the rectifier means output to produce a signal identifying the group of animals unbalancing the bridge.

7. Apparatus for determining which of three test animals moves into impedance modifying range of a coil energized by an alternating voltage source, comprising:
    a first metallic actuator carried by one of said animals having relatively high magnetic permeability and relatively low electrical conductivity;
    a second metallic actuator of geometry identical to said first actuator carried by another of said animals and having a relatively low magnetic permeability and relatively high electrical conductivity;
    a third metallic actuator of identical geometry to said first and second actuators having the same magnetic permeability as said second actuator and less electrical conductivity; and
    means responsive to the three different levels of impedance change in said coil produced by the animals with the respective actuators for producing respectively individual identifying signals.

8. Apparatus for providing signals indicative of any one of a number of different levels of change of impedance in coil means energized by a source of substantially constant frequency electrical power, comprising:
    first and second phase measuring means each having a pair of input terminals and an output terminal at which a signal appears proportional to the product of the voltage value at a first of said input terminals and the cosine of the difference in phase angles between the two inputs;
    means interconnecting the voltage at said coil means and said first input terminals of said first and second phase measuring means;
    first phase shifting means interconnecting the electrical power source and the second input terminal of the first phase measuring means;
    second phase shifting means interconnecting the electrical power source and the second input terminal of the second phase measuring means;
    said first and second phase shifting means being so adjusted that for at least one level of coil means impedance change the output of the first phase measuring means is zero and for at least one other level of coil means impedance change the second phase measuring means output is zero; and
    thresholded means connected to the outputs of said first and second phase measuring means for providing signals definitive of the different levels of coil means impedance change.

* * * * *